May 27, 1969          V. TÖRÖK          3,446,968
DEVICE FOR OPTICAL DETERMINATION OF THE POSITION
OF RADIATING OR REFLECTING BODY
Filed March 24, 1966          Sheet _1_ of 2

INVENTOR.
VILMOS TÖRÖK
BY
Bailey, Stephens + Huettig
ATTORNEYS

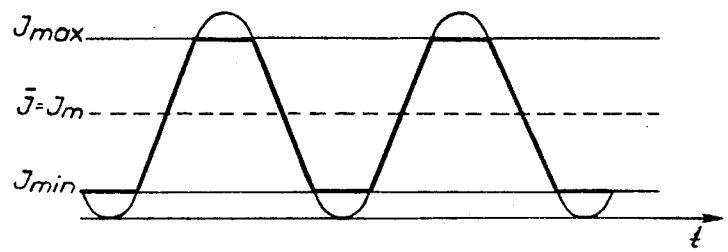
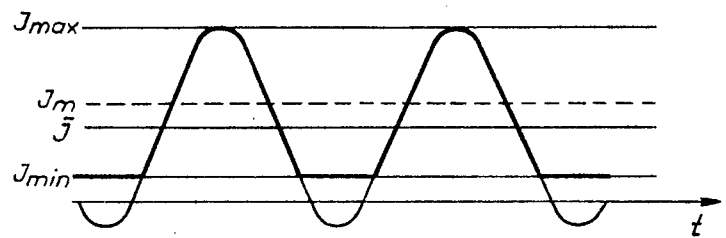
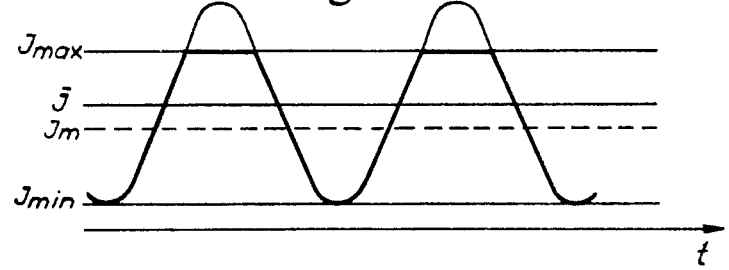

United States Patent Office 3,446,968
Patented May 27, 1969

3,446,968
DEVICE FOR OPTICAL DETERMINATION OF THE POSITION OF RADIATING OR REFLECTING BODY
Vilmos Török, Vasteras, Sweden, assignor to Allmänna Svenska Elektriska Aktiebolaget, Vasteras, Sweden, a corporation of Sweden
Filed Mar. 24, 1966, Ser. No. 537,074
Claims priority, application Sweden, Mar. 27, 1965, 3,995/65
Int. Cl. G01j 1/20
U.S. Cl. 250—201           5 Claims

ABSTRACT OF THE DISCLOSURE

An arrangement for the optical determination of the position of a radiating or reflecting body has a mirror for reflecting from a photocell light emitted or reflected from the body. The mirror is oscillated to scan a part of the body. The output voltage from the photocell has a D.C. component and an A.C. component. There is an arrangement for obtaining an algebraic mean value $I_m$ equal to half the sum of maximum and minimum values of the A.C. component and an arrangement for obtaining a mean time value equal to $$\frac{I}{T} \int_0^T I dt$$

Figure 1:
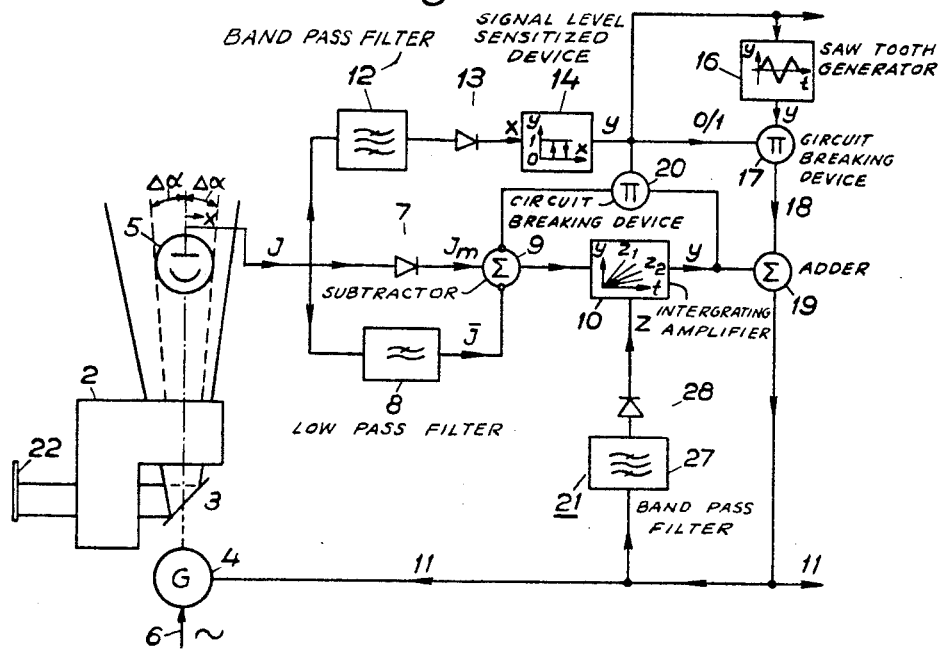

where T is a pre-determined time and I is the momentary value of the A.C. signals. These signals are combined and the combined signals are used to change the direction of the mirror.

---

The present invention relates to a device for optical position indication of a contrasting position, for example the edge of a shining or lighted object against a dark background. Such devices of different constructions are known, in which for example a photocell can scan by means of a sweep device the position of a shining object and thereby send out a signal corresponding to this position, which signal is utilised for measuring and/or regulating purposes. A disadvantage with such a device is the measuring uncertainty which occurs with varying beam intensities from the example a glowing strip. With strong intensity a reading is obtained already before the passage by the sweep device past the edge, while with a smaller intensity a reading closer to or at the edge is obtained.

Attempts have been made to remedy this disadvantage in different ways where greater demands of accuracy have been made, for example by compensative connection of two photocells, each indicating one edge of a glowing strip, but a disadvantage here is that it is difficult to obtain exactly the same sensitivity and measuring curve with two different photocells.

Attempts have also been made with mirror devices or the like to project a picture of a contrasting position and compare this with a measured picture of the same edge. Such a measuring result is relatively exact and relatively insensitive to intensity changes, but here the difficulty lies in the fact that devices must be found which are able to enclose a strip or another object to be measured and which are immediately destroyed upon a break in the strip or the like.

The invention gives a solution to the above and other problems connected therewith. It comprises a mirror known per se operating at the contrasting position to reflect emitted light towards a photocell, the mirror being given an oscillating movement for sweeping the field of vision over the contrasting position and the output signal from the photocell comprising at least one A.C. component. The invention is characterised in that the output signal from the photocell is partly fed to a device for producing an algebraic mean value of said signal, and partly to a device for producing a time mean value of the same signal, which mean value signals directly or indirectly are combined into one signal, such as a difference signal, which in its turn directly or indirectly is fed to an apparatus which can adjust the direction of the mirror.

Such a device only requires one photocell, so that the measuring accuracy is great, regardless of the intensity variations. At the same time the device can be applied in a protected way at a distance from the object to be measured. The reason for the accuracy of the device is evident from the following.

In a preferred embodiment a signal derived from the average value signals, for example their difference signal, is fed to an integrating amplifier and in a further development of the invention the amplification in this may be changed depending on the fundamental tone amplitude of the alternating current in the signal which regulates the adjusting apparatus of the mirror. For example at a small amplitude a high amplification is provided and at great amplitude a low amplification, whereby said amplitude may be kept approximately constant regardless of the measuring value, which means better safety of operation.

Figure 2:
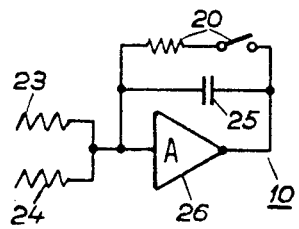

These and other connected advantages are more evident in the accompanying figures, of which FIG. 1 shows a schematic diagram of a complete equipment according to the invention and FIG. 2 a detail of this. FIGS. 3–5 show different curves at different positions of the object to be measured.

In FIG. 1 at 22 is shown an object to be measured such as a glowing strip of steel. Said object can, of course, also be a lighted object, such as a paper web, lit by one or several light sources. The two edges of the strip 22 (or the one edge) are scanned by means of an oscillating mirror 3 of a galvanometer 4 in a system 2. The oscillation is produced by means of an alternating current at 6. The radiation from the object to be measured is reflected in the field of vision (2·Δα) to a photocell 5, whose output signal I is partly fed to a means such as a number of rectifiers 7 (of the type shown in "Electronics for Scientists" by Malmstadt, Enke and Toren, New York, 1963 [hereinafter referred to as "Malmstadt"], FIG. 2–16, page 66, at 3 and 1) for producing an algebraic mean value ($I_m$) of the output signal of the photocell. The signal from the photocell 5 is also fed to a low pass filter 8 (such as shown in "Standard Handbook for Electrical Engineers" by Knowlton et al., New York, 1941, [hereinafter referred to as "Knowlton"], Section 2–221, FIG. 42) which allows the passage of direct current and possibly also a part of the fundamental tone of the alternating current, through which a time mean value I is obtained, this being equal to $$\frac{I}{T} \int_0^T I dt$$

$I_m$ and $\bar{I}$ are subtracted in a suitable way at 9 which may simply be a connection of the three lines and the difference signal ($I_m - \bar{I}$) is fed to an integrating amplifier 10

(such as shown in Malmstadt, Fig. 8–45, page 394), whose output signal ($y$) is fed to an apparatus 4 for changing the mean direction of the mirror in such a way that $I_m = \bar{I}$, that is in the case shown toward the centre of the object to be measured 22.

The device described above functions in the following way:

In FIG. 3 it is shown how the amplitudes of the signal are limited between $I_{max}$ and $I_{min}$ when the scanned field falls outside the field of vision of the photo cell 5 ($\Delta\alpha + \Delta\alpha$). The oscillation of the mirror 3 is adjusted so that this limitation is obtained. By reason of the fact that the mirror 3 in the symmetrical position is directed towards the centre of the object to be measured, the centre axle of the time mean value ($\bar{I}$) and the algebraic mean value ($I_m$) are coincident. The latter is calculated as $$\frac{I_{max.} + I_{min.}}{2}$$

As a measurement for the position of the strip edge, thus the direct current 11 fed to the galvanometer 4 can be used.

When the centre line is displaced due to the change in position of the object to be measured (FIG. 4) $I_m$ and $\bar{I}$ no longer coincide. The value of $I_m$ becomes substantially the same, while the time average value $\bar{I}$ is changed and a difference signal is obtained which is amplified and integrated ($y$).

Upon displacement in opposite direction (FIG. 5) a difference signal is also produced, but with opposite polarity.

In FIG. 2 is shown an example of the feeding of $I_m$ and $\bar{I}$ to the integrating amplifier 10. A voltage proportional to $I_m$ is taken out over the resistor 23 and a voltage proportional to $\bar{I}$ is taken out over the resistor 24. Said voltages are subtracted and are fed to the amplifier 26, reconnected through the capacitor 25.

The integrating amplifier (FIGS. 1 and 2) is reconnected over a relay 20 or a corresponding transistorised so-called switch connection. When this is open, the device functions according to the above. The signal I from the photocell 5 can in certain cases as shown in FIG. 1 be fed to a band pass filter 12 (as shown in Knowlton, Section 2–228, FIG. 44), which allows passage of the alternating current fundamental component of I, but blocks the direct current and harmonics. The signal from 12 is rectified at 13 similar to rectifier 7 and is fed to a signal level sensitive device 14 such as a transistorized relay, which above a certain level keeps the breaking device 20 open.

If the signal to 14 falls below a certain level, which means that the object 22 has come outside the scan field of the mirror 3, the breaking device 20 is closed and the output signal from the amplifier 10 becomes zero or is completely disconnected (not shown). At the same time a saw-tooth generator 16 (as shown in Malmstadt, FIG. 8–24, page 366) or the like is connected and its signal is fed over the now closed breaking device 17 of any known type through line 18 and an adding connection 19 for adding the signal from amplifier 10 to line 11 and then to an apparatus rotating the mirror 4 (at 4 or 2) and the complete field is scanned until its object 22 again comes into the field of vision of the photocell 5. Thus again the signal is produced in the device 14 and the breaking devices 20 and 17 are broken, the saw-tooth generator 16 is disconnected, the scanning (apart from the oscillation) is stopped and the output signal $y$ regulates the direction adjustment of the mirror.

In certain cases the device is also equipped with a special so-called adapting device 21. This consists of a band pass filter 27 similar to device 12 and a rectifier device 28, which regulates the degree of amplification of the amplifier 10. Only the alternating current fundamental tone of $y$ is allowed through the band pass filter and in 28 this is compared with a reference. When the fundamental tone is strong the rectifier 28 adjusts to weak amplification and vice versa, whereby the sensitivity of the complete device is increased also when the fundamental tone is weak.

The device can also be used for scanning an edge of a shining or lighted object and thus $I_m$ becomes a measure on the position of the edge. The output signal at 11 can also be used for regulating purposes, for example for adjusting the number of turns of a rolling mill motor, the tensile force of a reel, the number of rotations of a paper machine, etc., all intended to adjust the desired position for a contrasting position. Other variations are also feasible within the scope of the following claims.

I claim:

1. Device for optical determination of the position of a radiating or reflecting body, said device comprising a mirror for reflecting against a photocell light emitted or reflected from the body, means to give said mirror an oscillating movement for scanning an actual part of the body, the output voltage from the photocell having a D.C. component and at least one A.C. component, a first device for obtaining an algebraic mean value $I_m$, equal to $$\frac{I_{max.} + I_{min.}}{2}$$

where $I_{max}$ and $I_{min}$ are the maximum and minimum values respectively of the A.C. component, a second device for obtaining a time mean value $\bar{I}$, equal to $$\frac{I}{T} \int_0^T I dt$$

where T is a certain time and I the momentary value of the A.C. signal, the output of said photocell being coupled to said first and second devices, a combining means, the first and second devices being coupled to a said combining means, means for changing the mean direction of the mirror, the output of said combining means being connected to said direction changing means.

2. Device as claimed in claim 1, said first device comprising a low-pass filter, said second device being a rectifier.

3. Device as claimed in claim 1, said combining means comprising an integrating amplifier.

4. Device for optical determination of the position of a radiating or reflecting body, said device comprising a mirror for reflecting against a photocell light emitted or reflected from the body, means to give said mirror an oscillating movement for scanning an actual part of the body, the output voltage from the photocell having a D.C. component and at least A.C. component, a first device for obtaining an algebraic means value $\bar{I}_m$, equal to $$\frac{I_{max.} + I_{min.}}{2}$$

where $I_{max}$ and $I_{min}$ are the maximum and minimum values respectively of the A.C. component, a second device for obtaining a time mean value $\bar{I}$, equal to $$\frac{I}{T} \int_0^T I dt$$

where T is a certain time and I the momentary value of the A.C. signal, the output of said photocell being coupled to said first and second devices, a combining means, the first and second devices being coupled to said combining means, means for changing the mean direction of the mirror, the output side of the combining means being connected to the direction changing means, means for turning the mirror, sweep generator, means coupled to the means for turning the mirror to energize said turning means when the fundamental tone of the A.C. signal at the output side of the photocell is below a certain value.

5. Device as claimed in claim 4, amplitude measuring means, means to rectify the fundamental tone of the A.C. signal at the output side of the photocell and to feed it to amplitude measuring means, means responsive to a measurement by said amplitude measuring means below a predetermined value to render ineffective the output signal of the amplifier and simultaneously to couple in the sweep generator to the mirror turning means for changing the scanning field when the body has moved out of the previous scanning field.

References Cited

UNITED STATES PATENTS 2,659,823 11/1953 Vossberg _____ 250—235 X
3,041,459 6/1962 Greene _____ 250—234 X JAMES W. LAWRENCE, Primary Examiner.

C. R. CAMPBELL, Assistant Examiner.

U.S. Cl. X.R
250—203, 206, 235